Jan. 27, 1925.  1,524,219

A. STACHOFSKI

SINGLETREE CLIP

Filed July 14, 1923

INVENTOR
AUGUST. STACHOFSKI.

BY *Fetherstonhaugh & Co.*
ATTYS.

Patented Jan. 27, 1925.

1,524,219

UNITED STATES PATENT OFFICE.

AUGUST STACHOFSKI, OF WHITLA, ALBERTA, CANADA, ASSIGNOR OF ONE-HALF TO ALEXANDER MacGREGOR, OF MEDICINE HAT, ALBERTA, CANADA.

SINGLETREE CLIP.

Application filed July 14, 1923. Serial No. 651,543.

*To all whom it may concern:*

Be it known that I, AUGUST STACHOFSKI, a subject of the King of Great Britain, and resident of Whitla, in the Province of Alberta and Dominion of Canada, have invented certain new and useful Improvements in Singletree Clips, of which the following is a specification.

This invention relates to improvements in singletree clips and the objects of the invention are to provide a simple and effective device of this character for securing the traces in such a way that they cannot under any circumstances become accidentally detached.

A further object is the provision of a singletree clip provided with spring actuating means whereby the clip is automatically kept securely closed.

With the foregoing and other objects in view, the invention consists essentially in the device, an embodiment of which is described in the present specification and illustrated by the accompanying drawings that form part of the same.

Figure 1:
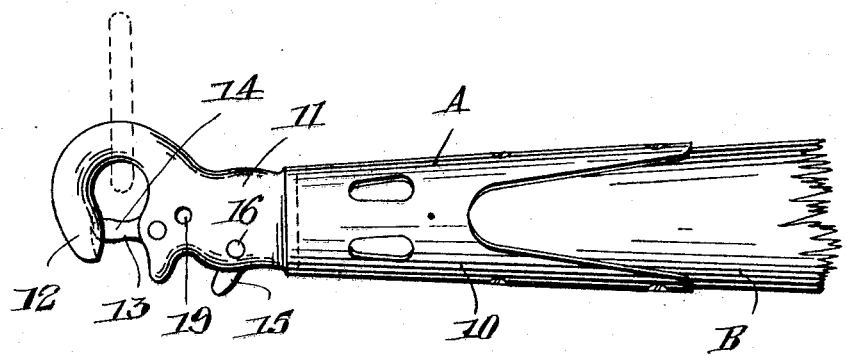

Referring now to the drawings, in which like characters of reference indicate corresponding parts in each figure, Figure 1 is a plan view of the singletree clip in position.

Figure 2:
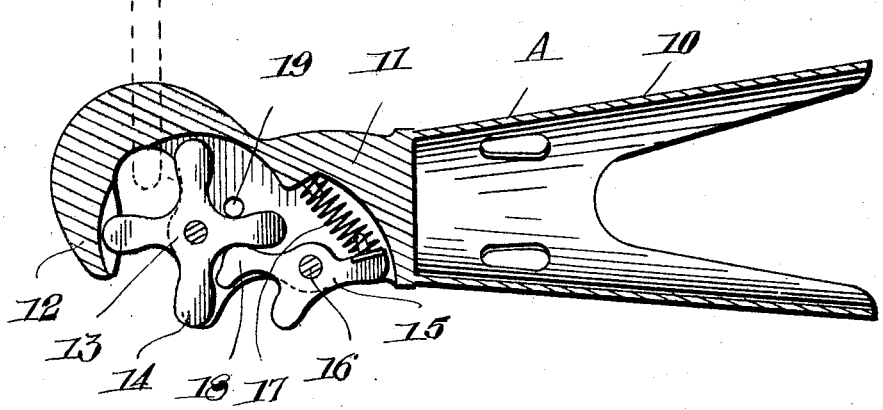

Figure 2 is a longitudinal section.

In the drawings, A represents the clip as a whole and B the singletree.

The clip A is constructed of suitable metal and is formed with a hollow cylindrical body portion 10 open at the end and adapted to engage with and embrace the singletree B, to be fixedly secured thereon, the outer or head portion 11 being extended in hooked formation at 12 to form a solid hook member, while the body of the clip is adapted to house a pivotally mounted cam member 13 formed with a plurality of arms 14 adapted to close the hook member and to engage therebetween with a second cam member 15 pivotally mounted at 16 and spring actuated by means of a spirally wound spring 17 connecting the lower end of the second cam member with the body of the clip, the second cam member being formed with a protruding lug 18 whereby it is operated to in turn operate the hooked closing member to open it. 19 is a hole for the insertion of a block or other means to hold the wheel in place, should a spring break.

To operate the closure member 13 to insert a trace or the like within the hook 12, the member 15 is first operated to allow one of the arms to rotate the member 13. A trace is then slipped over one of the arms of the latter member and pressure being exerted thereon it will revolve inwardly allowing the trace, as indicated by dotted lines in Figures 1 and 2, to slip off one of the arms 14 into the hook 12. When it is required to remove the trace the member 15 through pressure exerted on the lug 18 causes the member 13 to revolve outwardly leaving a space for the trace or the like to be removed.

It will thus be seen that once the trace is hitched or hooked, it is held in position by the automatic closing of the clip and that no pressure from the inside could release it until the lug 18 is operated by being pressed backwards.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A whiffletree hook comprising a hook portion, a rotatably mounted closure member formed with a plurality of spaced arms each adapted to close the mouth of said hook, and means for locking the closure member including a pivotally mounted member adapted to engage with said closure member between said arms to lock the closure member and means for automatically retaining the locking member in engagement with the closure member and means for operating the locking member to release and open the closure member.

2. The device as claimed in claim 1 in which the automatically retaining means comprise a coil spring connecting the lower end of the locking member with the body of the hook.

3. The device as claimed in claim 1 in which the operating means for the locking member includes a lug integral therewith and adapted to protrude beyond the body portion of the hook whereby on the lug being pressed the engaging portion of the locking member moves outwardly from the closure member to release the latter.

In witness whereof I have hereunto set my hand in the presence of two witnesses.

AUGUST STACHOFSKI.

Witnesses:
L. D. STANCY,
ALEX. MACGREGOR.